(12) United States Patent  (10) Patent No.: US 8,427,116 B2
Rozman et al.  (45) Date of Patent: Apr. 23, 2013

(54) STARTING/GENERATING SYSTEM WITH MULTI-FUNCTIONAL CIRCUIT BREAKER

(71) Applicant: Hamilton Sundstrand Corporation, Windsor Locks, CT (US)

(72) Inventors: Gregory I. Rozman, Rockford, IL (US); Matthew L. Wilhide, Cherry Valley, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 0 days.

(21) Appl. No.: 13/632,850

(22) Filed: Oct. 1, 2012

(65) Prior Publication Data

US 2013/0033038 A1    Feb. 7, 2013

Related U.S. Application Data

(62) Division of application No. 12/479,211, filed on Jun. 5, 2009, now Pat. No. 8,299,762.

(51) Int. Cl.
  *F02N 11/04*  (2006.01)
(52) U.S. Cl.
  USPC ............................................. 322/37; 322/99
(58) Field of Classification Search .......... 322/24, 322/28, 37, 44, 99
  See application file for complete search history.

(56) References Cited

U.S. PATENT DOCUMENTS

| 5,363,032 | A | * | 11/1994 | Hanson et al. | 322/10 |
| 5,493,200 | A | * | 2/1996 | Rozman et al. | 322/10 |
| 5,581,168 | A | * | 12/1996 | Rozman et al. | 318/723 |
| 5,594,322 | A | * | 1/1997 | Rozman et al. | 322/10 |
| 6,093,975 | A | | 7/2000 | Peticolas | |
| 6,578,681 | B1 | | 6/2003 | Raad | |
| 6,744,644 | B2 | | 6/2004 | Kojori | |
| 7,508,086 | B2 | * | 3/2009 | Huang et al. | 290/31 |
| 7,514,807 | B2 | * | 4/2009 | Donnelly et al. | 290/40 C |
| 7,806,095 | B2 | | 10/2010 | Cook et al. | |
| 7,855,466 | B2 | * | 12/2010 | Bax et al. | 290/40 C |
| 8,299,762 | B2 | * | 10/2012 | Rozman et al. | 322/37 |
| 2008/0111420 | A1 | | 5/2008 | Anghel et al. | |
| 2010/0308582 | A1 | * | 12/2010 | Rozman et al. | 290/31 |

FOREIGN PATENT DOCUMENTS

| JP | 4289740 A | 10/1992 |
| JP | 6284709 A | 10/1994 |
| JP | 2007089264 A | 4/2007 |

OTHER PUBLICATIONS

The extended European Search Report in related European Patent Application 10164414.4 filed May 30, 2010.

* cited by examiner

*Primary Examiner* — Nicholas Ponomarenko
(74) *Attorney, Agent, or Firm* — Kinney & Lange, P.A.

(57) ABSTRACT

A starting/generating system includes a rotor portion and a stator portion. The stator portion is connected to a DC power source during starting operations and to a DC load during generating operations, and includes a DC link having a first and second DC link bus, a DC link capacitor connected between the DC link buses, and an inverter/rectifier that converts AC power to DC power and vice versa. A switching device is connected in series on the first DC link bus and is controlled by a controller that turns the switching device On and Off to provide various functionality to the starting/generating system.

7 Claims, 1 Drawing Sheet

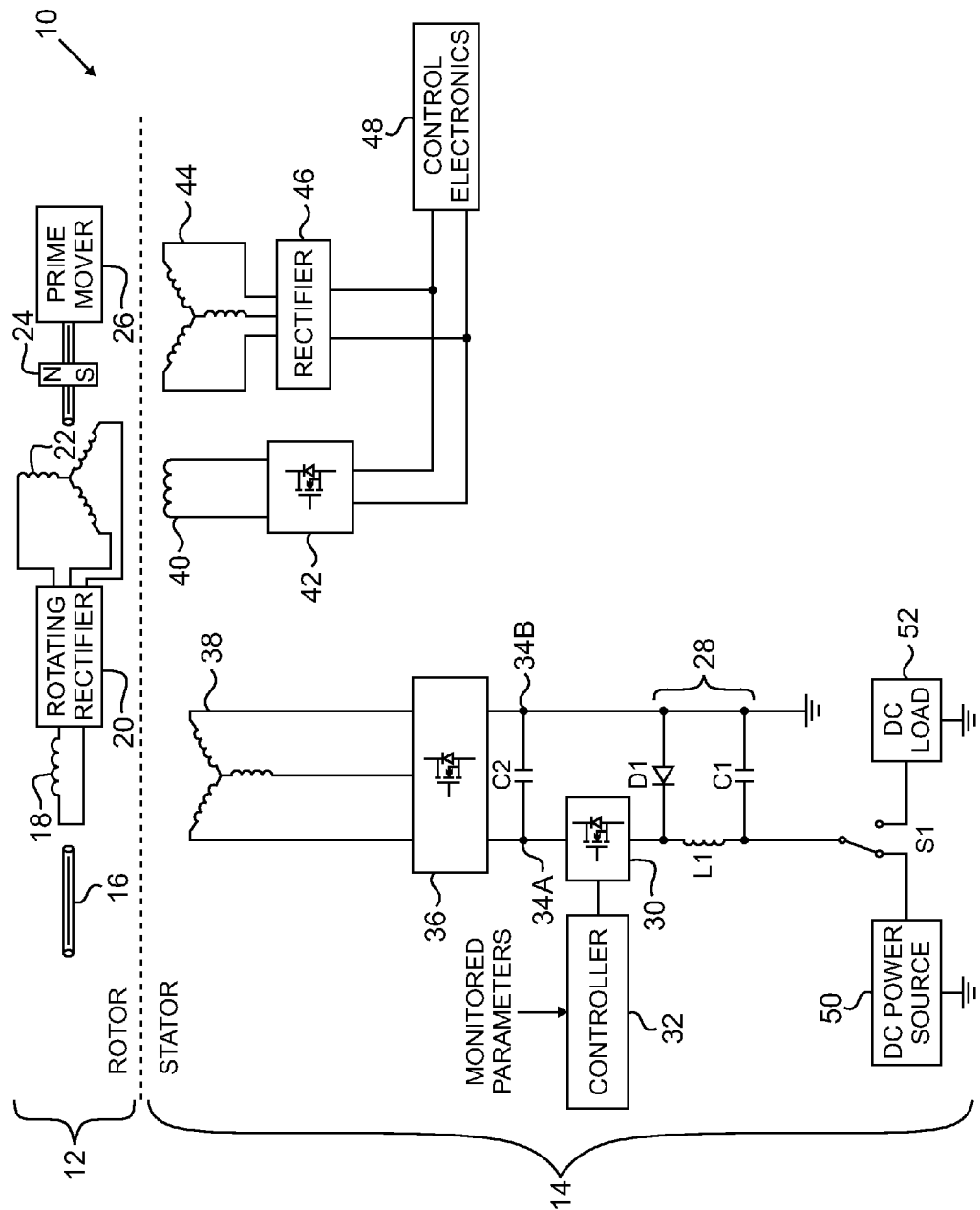

STARTING/GENERATING SYSTEM WITH MULTI-FUNCTIONAL CIRCUIT BREAKER

CROSS-REFERENCE TO RELATED APPLICATION(S)

This application is a Divisional of U.S. patent application Ser. No. 12/479,211, entitled "STARTING/GENERATING SYSTEM WITH MULTI-FUNCTIONAL CIRCUIT BREAKER", which was filed Jun. 5, 2009.

BACKGROUND

The present invention is related generally to electrical power systems, and in particular to starting/generating systems.

Starting/generating systems refer to systems capable of operating in either a starting mode in which the system operates as a motor to accelerate a rotor portion to a desired speed or in a generating mode in which the system operates as a generator to convert mechanical energy provided by the rotor portion into electrical energy for distribution to attached loads.

Depending on the mode, various electronic circuits are required to provide the desired functionality. During starting, a pre-charging or soft-start circuit may be employed to prevent large in-rush currents from damaging a DC link capacitor(s). For example, prior art pre-charge circuits may employ a switching device and resistor (connected in parallel with one another) connected in series on the DC link bus between the power supply and the inverter/rectifier circuit. The switching device is turned OFF in order to force current through the resistor connected in parallel with the switching device, thereby limiting the current provided to the inverter/rectifier circuit and DC link capacitor. However, this topology does not provide functionality beyond pre-charge operations. Alternatively, the switching device and resistor can be placed in series with the DC link capacitor, which is connected between the DC link buses in parallel with the inverter/rectifier circuit. In this way, the switching device is not required to be capable of carrying the full inverter/rectifier current, but the presence of the switching device in series with the capacitor decreases the performance of the DC link capacitor, due to the resistance of the switching device.

In addition to circuits or components employed to provide pre-charging functionality, starting/generating systems employ additional hardware/circuits to implement functions such as battery charging, power flow enablement, and fault protection. These additional hardware/circuit components add to the overall cost and weight of starting/generating systems, reduction of which is desirable.

SUMMARY

A pre-charge circuit limits in-rush currents on a direct current (DC) link that includes a first DC link bus and a second DC link bus. The pre-charge circuit includes a switching device connected in series with the first DC link bus. The switching device has an ON state in which power flow is enabled on the DC link and an OFF state in which power is disabled on the DC link. A controller selectively modulates the state of the switching device to limit in-rush currents during pre-charge on the DC link. In addition, the pre-charge circuit can be used subsequent to pre-charge of the DC link to implement additional functionality with respect to power flow on the DC link.

BRIEF DESCRIPTION OF THE DRAWINGS

FIG. 1 is a circuit diagram illustrating a starting/generating system according to an embodiment of the present invention.

DETAILED DESCRIPTION

FIG. 1 is a circuit diagram of starting/generating system 10 according to an embodiment of the present invention. System 10 includes rotor portion 12 and stator portion 14. Rotor portion 12 includes motive power shaft 16, main generator portion field winding 18, rotating rectifier 20, three-phase armature windings 22, permanent magnet generator (PMG) magnets 24, and prime mover 26. Stator portion 14 includes filter circuit 28 (which includes capacitor C1, inductor L1, and diode D1), solid state circuit breaker 30, controller 32, DC link buses 34a and 34b (collectively DC link 34), DC link capacitor C2, inverter/rectifier 36, main generator portion armature winding 38, exciter field winding 40, H-bridge 42, three-phase (PMG) stator windings 44, rectifier 46 and control electronics 48. Power source 50 represents a generic power source for providing DC power to starting/generating system 10 during starting operations and DC load 52 represents a generic load that receives power from starting/generating system 10 during generating operations. The embodiment shown in FIG. 1 represents the system employed with respect to a wound field synchronous generator, but would be applicable to other generator systems such as flux regulated permanent magnet generators and other well-known starting/generating systems.

In the starting mode, electrical energy provided by DC power source 50 is converted to alternating current (AC) power by inverter/rectifier 36 (operating as an inverter). Further, the exciter power converter H-bridge 42 delivers AC power to the exciter field winding 40. The exciter acts as a rotary transformer having a primary winding comprising the field winding 40 and secondary windings comprising the armature windings 22 so that AC power is induced in the armature windings 22. The AC power is rectified by the rotating rectifier 20 and applied as DC power to the main generator portion field winding 18. The AC power is provided to main generator portion armature winding 38, which interacts with main generator portion field winding 18 to generate motive force that causes rotor portion to rotate.

In the generating mode, mechanical energy provided by prime mover 26 is converted to electrical energy. In particular, rotation of PMG magnets 24 generates electrical energy in three-phase PMG stator windings 44. Rectifier 46 converts the AC voltage to a DC voltage that is selectively supplied to exciter field winding 40 via H-bridge 42. The DC excitation provided by exciter field winding 40 interacts with three-phase armature windings 22. The DC current in exciter field winding 40 is controlled in response to the output DC voltage applied to DC load 52 by a voltage regulator located within control electronics 48. The AC voltage generated by three-phase armature windings 22 is converted to DC by rotating rectifier 20 and supplied to main generator portion field winding 18. The rotating field generated by field winding 18 interacts with main generator portion armature winding 38 to generate AC voltage. Inverter/rectifier 36 (operating as a rectifier) converts the AC voltage to DC voltage that is supplied to DC load 52. In addition, the DC voltage may be used to charge an attached battery (for example, DC power source 50). The dual functionality of starting/generating system 10 is illustrated visually by switch S1, which indicates that starting/generating system may receive power from DC source 50 (starting mode) and may supply power to a DC load 52

(generating mode). Although in some embodiments, the DC power source (i.e., battery) may also act as a DC load during re-charging of the battery from power generated by starting/generating system 10.

Solid-state circuit breaker 30 is connected on DC link bus 34a in series between inverter/rectifier 36 and DC power source 50 (or DC load 52, depending on the mode of operation). Solid-state circuit breaker 30 combines functionality previously provided by a plurality of individual circuits. During pre-charge (i.e., soft-starting) of DC link capacitor C2, the state of solid-state circuit breaker 30 is selectively modulated (i.e., turned ON and OFF) to control in-rush currents. During a starting mode (subsequent to pre-charge), solid-state circuit breaker 30 is selectively controlled to enable power flow from DC power source 50 to inverter/rectifier 36 and to disable power flow from inverter/rectifier 36 to DC power source 50. During a generating mode, solid-state circuit breaker 30 enables power provided by the generator to be supplied to DC load 52, and is selectively controlled (i.e., turned OFF) in response to fault conditions such as short-circuit conditions, overload conditions, etc., to prevent damage to the generator and/or DC load 52. Also during the generating modes, solid-state circuit breaker 30 is selectively modulated to provide a desired current profile for battery charging operations.

Pre-charging (i.e., soft-starting) of DC link capacitor C2 prevents large currents from damaging DC link capacitor C2 during an initial application of power from DC power source 50. Pre-charging functionality is provided by selectively modulating solid-state circuit breaker 30 (i.e., turning it ON and OFF). In-rush current is a function of the voltage applied to the capacitor and the characteristics of the capacitor. By selectively modulating solid-state circuit breaker 30, the voltage applied to DC link capacitor C2 can be controlled, thereby limiting the in-rush current provided to DC link capacitor C2.

In one embodiment, controller 32 monitors one or more parameters and based on the monitored parameters selectively controls the modulation of solid-state circuit breaker 30. The operation of controller 32 may be closed-loop or open-loop, depending on the application. In an open-loop application, the duty cycle of solid-state circuit breaker 30 is selectively controlled without feedback regarding the voltage or current provided to DC link capacitor C2. For instance, controller 32 may control the duty cycle based on the length of time from application of power from DC power source 50, with the duty cycle increasing based on some function (linearly or non-linearly) until the expiration of the pre-charge cycle. At the end of the pre-charge cycle solid-state circuit breaker 30 is turned ON (i.e., maintained in the ON state continuously) such that DC power source 50 supplies power to inverter/rectifier 36 for starting operations.

In closed-loop applications, controller 32 monitors one or more parameters and in response selectively controls the modulation (i.e., duty cycle) of solid-state circuit breaker 30. Examples of parameters used to determine the modulation of solid-state circuit breaker 30 include the monitored DC link voltage, the monitored DC link capacitor current, and/or the monitored DC link current. Based on these parameters controller 32 can selectively control in-rush currents during pre-charge of DC link capacitor C2. For example, because the in-rush current is dependent on the voltage supplied to DC link capacitor C2, the monitored DC link voltage may be used as feedback to selectively control the in-rush current. Controller 32 monitors the voltage across DC link and in response selectively modulates solid-state circuit breaker 30 to provide the desired pre-charge of capacitor C2. As the voltage across DC link increases, the duty cycle of solid-state circuit breaker 30 is selectively increased until some pre-charge threshold, at which time solid-state circuit breaker is maintained in the ON state (continuously) to provide starting power to inverter/rectifier 36. In other embodiments, the monitored DC link current and/or DC link capacitor current can be used as feedback to selectively control the in-rush current. Once again, the duty cycle is increased until at the end of the pre-charge cycle solid-state transistor 30 is maintained in the ON state (continuously) to provide starting power to inverter/rectifier 36. Monitoring the in-rush current directly provides feedback regarding the output to be controlled, but requires additional hardware (e.g., current sensors) to implement.

Solid-state circuit breaker 30 may also be used to selectively enable power flow during starting operations and may be used to disable power flow in response to the voltage generated by the generator exceeding the voltage provided by DC power source 50 (prior to supplying voltage from the generator to DC load 52). For example, having pre-charged DC link capacitor C2, solid-state circuit breaker 30 is selectively controlled (i.e., turned ON) to enable power flow from DC power source 50 to inverter/rectifier 36 to operate in a starting mode that may include accelerating rotor portion 12, igniting a combustor (for gas turbine engines) and assisting in accelerating the rotor portion 12 to a desired speed following successful ignition. Subsequent to these stages, solid-state circuit breaker 30 is turned OFF to prevent power generated by starting/generating system 10 from flowing into DC power source 50. For example, when the voltage provided by starting/generating system 10 (i.e., the DC power provided by inverter/rectifier 36) exceeds the magnitude of the DC voltage provided by DC power source 50, then controller 32 turns solid-state circuit breaker 30 OFF to disable power flow from DC power source to starting/generating system 10 (or vice versa).

Circuit breaker 30 may also be employed during the generating mode to provide the desired current profile for optimal battery charging. For example, DC power source 50 may be a battery that requires re-charging after each starting operation. Rather than employ a separate circuit for monitoring and controlling the current profile provided to the battery (i.e., DC power source 50), controller 32 monitors the current provided to the battery and selectively modulates solid-state circuit breaker 30 to provide the desired current profile for charging. Typically, the current provided to the battery is sensed and provided as feedback to controller 32, although in other embodiments other parameters may be monitored and used in feedback to control the current profile during battery charging operations.

Solid-state circuit breaker may also be employed to provide fault protection during the generator mode by selectively disabling power flow from starting/generating system 10 to DC load 30 in response to a detected fault condition. For example, controller 32 may monitor one or more parameters, such as DC link voltage, DC link current and/or DC link capacitor current to detect faults such as short-circuits. In response to a detected fault, controller 32 causes solid-state circuit breaker 30 to turn OFF to prevent excessive currents from being provided to DC load 52. In one embodiment, the fault protection provided by solid-state circuit breaker is not activated until a detected fault has existed on the link for a predetermined period of time, to prevent transient conditions from initiating fault protection. Additional parameters well-known in the art for detecting fault conditions may also be monitored by controller 32. In addition, other controllers, such as control electronics 48, may provide input to controller 32 regarding detected fault conditions. In response to these inputs, controller 32 selectively activates fault protection by turning OFF solid-state circuit breaker 30.

The present invention provides a starting/generating circuit topology in which a solid-state circuit breaker is employed to implement a number of functions required at various stages starting/generating system operation. The solid-state circuit breaker is connected in series on a DC link bus and is selectively controlled (e.g., turned ON and OFF) to provide the desired functionality.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A starting/generating system comprising:
    a rotor portion;
    a stator portion located to interact with the rotor portion, and for connecting to a DC power source during starting operations and to a DC load during generating operations, the stator portion comprising:
        a DC link having a first DC link bus and a second DC link bus;
        a DC link capacitor connected between the first DC link bus and the second DC link bus;
        an inverter/rectifier connected to convert DC power to AC power during starting operations and to convert AC power to DC power during generating operations;
        a switching device connected in series on the first DC link bus; and
        a controller connected to control the state of the switching device, wherein the controller selectively controls the state of the switching device to provide various functionality depending on the operating state of the starting/generating system.

2. The starting/generating system of claim 1, wherein the controller modulates the state of the switching device to limit in-rush currents during pre-charging of the DC link capacitor.

3. The starting/generating system of claim 2, wherein the controller selectively controls the modulation of the switching device based on at least one monitored parameter selected from the group consisting of: DC link voltage, DC link current, DC link capacitor current, and a combination thereof.

4. The starting/generating system of claim 1, wherein the controller turns the switching device ON to enable power flow from the DC power source to the inverter/rectifier during starting operations.

5. The starting/generating system of claim 1, wherein the controller turns the switching device OFF to disable power flow from the DC power source to the inverter/rectifier in response to DC voltage provided by the starting/generating system exceeds the DC voltage provided by the DC power source.

6. The starting/generating system of claim 1, wherein during generating operations the stator portion is connectable to a battery such that DC power generated by the inverter/rectifier provides charging power to the battery, wherein the controller modulates the state of the switching device during the generating mode to generate a desired current profile for charging the battery.

7. The starting/generating system of claim 1, wherein in response to a detected fault condition during generating operations, the controller turns the switching device OFF.

* * * * *